(12) United States Patent
Nakagawa et al.

(10) Patent No.: US 12,154,602 B2
(45) Date of Patent: *Nov. 26, 2024

(54) MAGNETIC HEAD AND MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yuji Nakagawa, Kawasaki Kanagawa (JP); Masayuki Takagishi, Kunitachi Tokyo (JP); Naoyuki Narita, Funabashi Chiba (JP); Tomoyuki Maeda, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,613

(22) Filed: Aug. 1, 2023

(65) Prior Publication Data
US 2024/0296864 A1 Sep. 5, 2024

(30) Foreign Application Priority Data
Mar. 1, 2023 (JP) ................... 2023-031361

(51) Int. Cl.
*G11B 5/31* (2006.01)
*G11B 5/027* (2006.01)

(52) U.S. Cl.
CPC .......... *G11B 5/3146* (2013.01); *G11B 5/027* (2013.01); *G11B 2220/2516* (2013.01)

(58) Field of Classification Search
None
See application file for complete search history.

(56) References Cited

U.S. PATENT DOCUMENTS 7,616,412 B2    11/2009   Zhu et al.
9,007,721 B2 *   4/2015   Sato ................. G11B 5/17
                                                   360/125.3

(Continued)

FOREIGN PATENT DOCUMENTS

JP   2008-277586 A   11/2008
JP   2009-064499 A    3/2009

(Continued)

OTHER PUBLICATIONS

X. Bai and J.-G. Zhu, "Effective Field Analysis of Segmented Media for Microwave-Assisted Magnetic Recording", in IEEE Magnetics Letters, vol. 8, pp. 1-4, 2017.

(Continued)

*Primary Examiner* — William J Klimowicz
(74) *Attorney, Agent, or Firm* — Knobbe Martens Olson & Bear LLP (57) ABSTRACT

According to one embodiment, a magnetic head includes a first magnetic pole, a second magnetic pole, and a magnetic element provided between the first and the second magnetic poles. The magnetic element includes first to fifth magnetic layers, and first to sixth non-magnetic layers. The sixth non-magnetic layer is provided between the fifth magnetic layer and the second magnetic pole. The sixth non-magnetic layer includes at least one selected from the group consisting of Cu, Au, Cr, Al, V and Ag.

7 Claims, 8 Drawing Sheets

(56) References Cited

U.S. PATENT DOCUMENTS

| | | |
|---|---|---|
| 9,064,508 B1 | 6/2015 | Shiimoto et al. |
| 9,117,474 B1 | 8/2015 | Contreras et al. |
| 10,522,174 B1* | 12/2019 | Chen .................... G11B 5/1278 |
| 10,937,450 B1 | 3/2021 | Kawasaki et al. |
| 11,393,493 B1* | 7/2022 | Nakagawa ............. G11B 5/193 |
| 11,398,244 B2* | 7/2022 | Takagishi ............. G11B 5/1278 |
| 11,568,891 B1* | 1/2023 | Chen .................... G11B 5/3133 |
| 2008/0019040 A1 | 1/2008 | Zhu et al. |
| 2008/0268291 A1 | 10/2008 | Akiyama et al. |
| 2009/0052095 A1 | 2/2009 | Yamada et al. |
| 2009/0059417 A1 | 3/2009 | Takeo et al. |
| 2012/0126905 A1 | 5/2012 | Zhang et al. |
| 2012/0164487 A1* | 6/2012 | Childress ............. G11B 5/1278 360/110 |
| 2012/0176702 A1 | 7/2012 | Yamada et al. |
| 2013/0050869 A1 | 2/2013 | Nagasaka et al. |
| 2019/0088275 A1 | 3/2019 | Narita et al. |
| 2020/0294537 A1* | 9/2020 | Nagasawa ............. B32B 15/013 |
| 2021/0142821 A1* | 5/2021 | Iwasaki ................ G11B 5/314 |
| 2021/0375309 A1* | 12/2021 | Iwasaki ................ G11B 5/1278 |
| 2022/0005497 A1* | 1/2022 | Takagishi ............. G11B 5/1278 |
| 2022/0084551 A1 | 3/2022 | Koizumi |
| 2022/0157335 A1* | 5/2022 | Iwasaki ................ G11B 5/313 |
| 2022/0270640 A1* | 8/2022 | Nakagawa ........... G11B 5/1877 |
| 2022/0270641 A1* | 8/2022 | Nakagawa ........... G11B 5/3146 |
| 2022/0399035 A1 | 12/2022 | Goncharov et al. |
| 2023/0031273 A1* | 2/2023 | Nakagawa ........... G11B 5/1278 |
| 2023/0046928 A1* | 2/2023 | Nakagawa ........... G11B 5/3146 |
| 2023/0178102 A1* | 6/2023 | Nakagawa ........... G11B 5/3163 428/810 |
| 2024/0029759 A1 | 1/2024 | Chen et al. |
| 2024/0144961 A1 | 5/2024 | Asif Bashir et al. |
| 2024/0144962 A1 | 5/2024 | Asif Bashir et al. |
| 2024/0144963 A1 | 5/2024 | Asif Bashir et al. |

FOREIGN PATENT DOCUMENTS

| | | |
|---|---|---|
| JP | 4358279 B2 | 11/2009 |
| JP | 2012-146351 A | 8/2012 |
| JP | 2019-057338 A | 4/2019 |
| JP | 2022-012263 A | 1/2022 |
| JP | 2022-050037 A | 3/2022 |
| JP | 2022-129730 A | 9/2022 |
| JP | 2023-083663 A | 6/2023 |

OTHER PUBLICATIONS

T. Tanaka, et al., "MAMR writability and signal-recording characteristics on granular exchange-coupled composite media" in Journal of Magnetism and Magnetic Materials 529 (2021).

Office Action of corresponding U.S. Appl. No. 18/358,872 issued on Jun. 18, 2024, 17 pages.

* cited by examiner

MAGNETIC HEAD AND MAGNETIC RECORDING DEVICE

CROSS-REFERENCE TO RELATED APPLICATIONS

This application is based upon and claims the benefit of priority from Japanese Patent Application No. 2023-031361, filed on Mar. 1, 2023; the entire contents of which are incorporated herein by reference.

FIELD

Embodiments described herein relate generally to a magnetic head and a magnetic recording device.

BACKGROUND

Information is recorded on a magnetic recording medium such as an HDD (Hard Disk Drive) using a magnetic head. It is desired to improve recording density in the magnetic recording device.

DETAILED DESCRIPTION

According to one embodiment, a magnetic head includes a first magnetic pole, a second magnetic pole, and a magnetic element provided between the first magnetic pole and the second magnetic pole. The magnetic element includes a first magnetic layer, a second magnetic layer provided between the first magnetic layer and the second magnetic pole, a third magnetic layer provided between the second magnetic layer and the second magnetic pole, a fourth magnetic layer provided between the third magnetic layer and the second magnetic pole, a fifth magnetic layer provided between the fourth magnetic layer and the second magnetic pole, a first non-magnetic layer provided between the first magnetic pole and the first magnetic layer, a second non-magnetic layer provided between the first magnetic layer and the second magnetic layer, a third non-magnetic layer provided between the second magnetic layer and the third magnetic layer, a fourth non-magnetic layer provided between the third magnetic layer and the fourth magnetic layer, a fifth non-magnetic layer provided between the fourth magnetic layer and the fifth magnetic layer, and a sixth non-magnetic layer provided between the fifth magnetic layer and the second magnetic pole. The sixth non-magnetic layer includes at least one selected from the group consisting of Cu, Au, Cr, Al, V and Ag.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1:
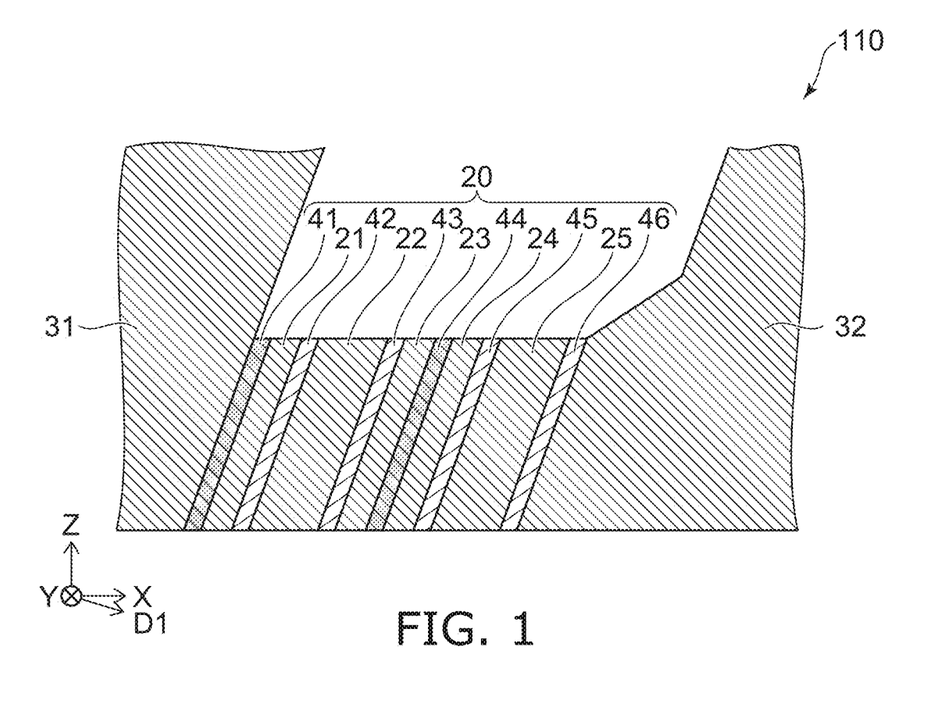
FIG. 1 is a schematic cross-sectional view illustrating a magnetic head according to a first embodiment.

FIG. 1 is a schematic cross-sectional view illustrating a magnetic head according to a first embodiment.

Figure 2:
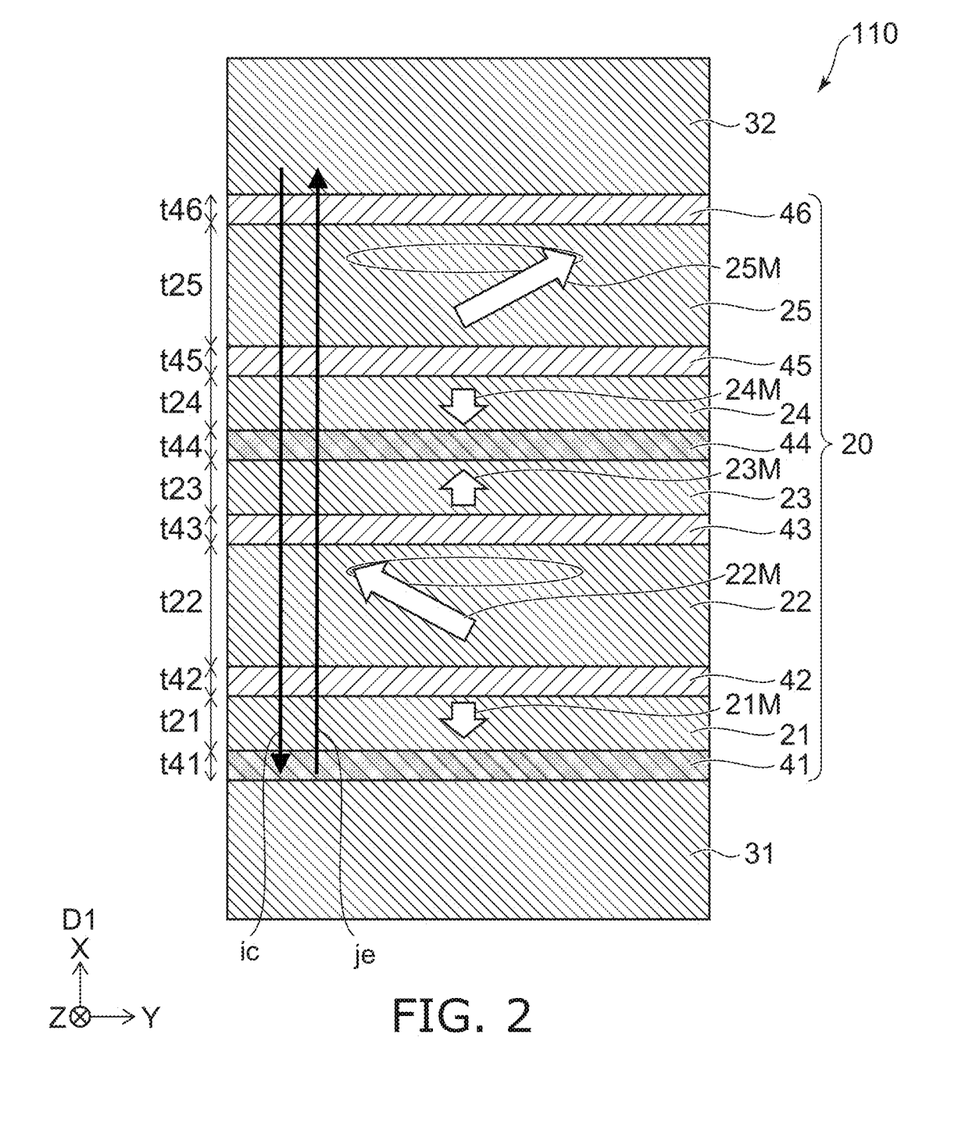
FIG. 2 is a schematic plan view illustrating the magnetic head according to the first embodiment.

FIG. 2 is a schematic plan view illustrating the magnetic head according to the first embodiment.

Figure 3:
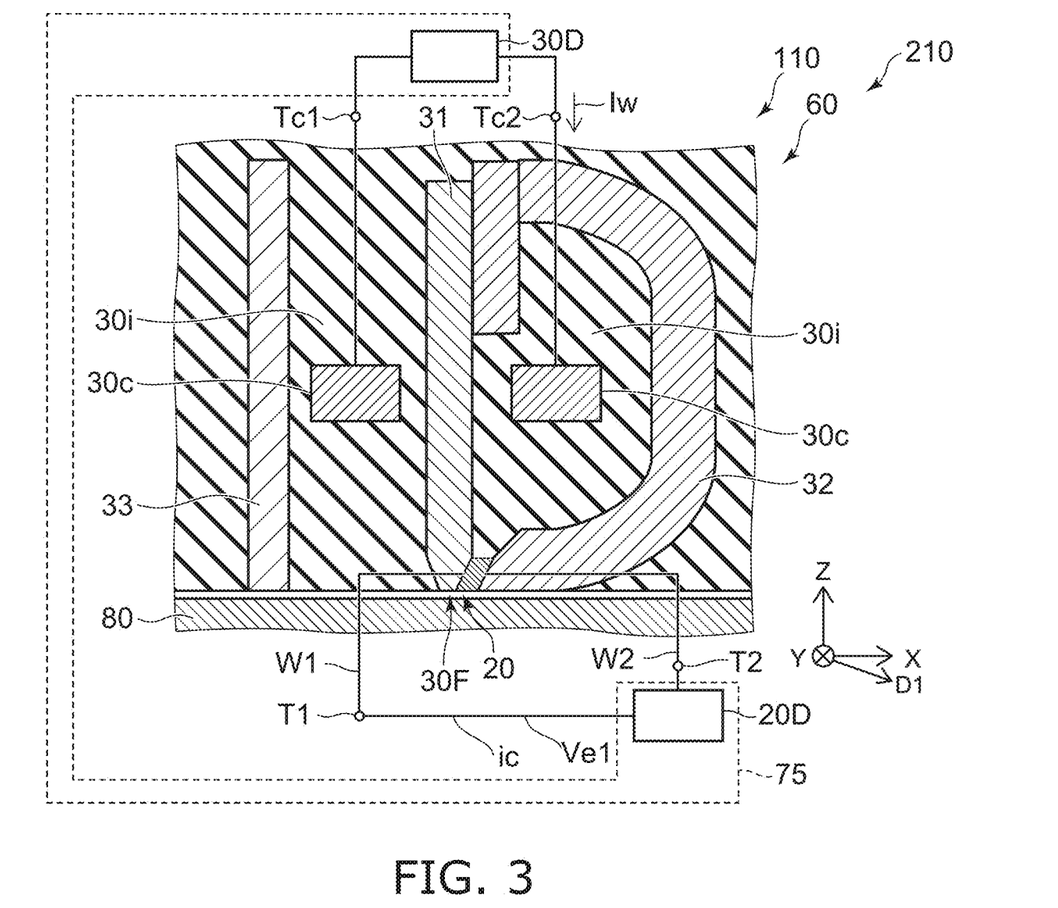
FIG. 3 is a schematic cross-sectional view illustrating the magnetic recording device including the magnetic head according to the first embodiment.

FIG. 3 is a schematic cross-sectional view illustrating the magnetic recording device including the magnetic head according to the first embodiment.

As shown in FIG. 3, a magnetic recording device 210 according to the embodiment includes a magnetic head 110 and a controller 75. The magnetic recording device 210 may include a magnetic recording medium 80. At least a recording operation is performed in the magnetic recording device 210. In the recording operation, information is recorded on the magnetic recording medium 80 using the magnetic head 110.

The magnetic head 110 includes a first magnetic pole 31, a second magnetic pole 32 and a magnetic element 20. The magnetic head 110 may include coil 30c. The first magnetic pole 31, the second magnetic pole 32, the magnetic element 20 and the coil 30c are included in the recording section 60. As will be described below, the magnetic head 110 may include a reproducing section. The magnetic element 20 is provided between the first magnetic pole 31 and the second magnetic pole 32.

For example, the first magnetic pole 31 and the second magnetic pole 32 form a magnetic circuit. The first magnetic pole 31 is, for example, a main magnetic pole. The second magnetic pole 32 is, for example, a trailing shield. The first magnetic pole 31 may be the trailing shield and the second magnetic pole 32 may be the main pole.

A direction from the magnetic recording medium 80 to the magnetic head 110 is defined as a Z-axis direction. One direction perpendicular to the Z-axis direction is defined as an X-axis direction. A direction perpendicular to the Z-axis direction and the X-axis direction is defined as a Y-axis direction. The Z-axis direction corresponds to, for example, the height direction. The X-axis direction corresponds to, for example, the down-track direction. The Y-axis direction corresponds to, for example, the cross-track direction. The magnetic recording medium 80 and the magnetic head 110 move relatively along the down-track direction. A recording magnetic field generated by a magnetic head 110 is applied to a desired position on the magnetic recording medium 80.

Magnetization at a desired position of the magnetic recording medium 80 is controlled in a direction according to the recording magnetic field. Thus, information is recorded on the magnetic recording medium 80.

A direction from the first magnetic pole 31 to the second magnetic pole 32 is defined as a first direction D1. The first direction D1 is substantially along the X-axis direction. In the embodiments, the first direction D1 may be inclined with respect to the X-axis direction. The angle of inclination is, for example, more than 0 degrees and not more than 30 degrees.

In this example, a portion of coil 30c is provided between the first magnetic pole 31 and the second magnetic pole 32. In this example, a shield 33 is provided. The first magnetic pole 31 is provided between the shield 33 and the second magnetic pole 32 in the X-axis direction. Another portion of coil 30c is provided between the shield 33 and the first magnetic pole 31. An insulating portion 30i is provided between these multiple elements. The shield 33 is, for example, a leading shield. The magnetic head 110 may also include side shields (not shown).

As shown in FIG. 3, the first magnetic pole 31 includes a medium facing surface 30F. The medium facing surface 30F is, for example, an ABS (Air Bearing Surface). The medium facing surface 30F faces the magnetic recording medium 80, for example. The medium facing surface 30F extends, for example, along the X-Y plane.

As shown in FIG. 3, the controller 75 includes a recording circuit 30D and an element circuit 20D. A recording current Iw is supplied from the recording circuit 30D to the coil 30c. For example, a first coil terminal Tc1 and a second coil terminal Tc2 are provided on the coil 30c. The recording current Iw is supplied to the coil 30c via these coil terminals. The recording magnetic field corresponding to the recording current Iw is applied to the magnetic recording medium 80 from the first magnetic pole 31.

As shown in FIG. 3, the element circuit 20D is electrically connected to the magnetic element 20. In this example, the magnetic element 20 is electrically connected to the first magnetic pole 31 and the second magnetic pole 32. In the magnetic head 110, a first terminal T1 and a second terminal T2 are provided. The first terminal T1 is electrically connected to one end of the magnetic element 20 via the first wiring W1 and the first magnetic pole 31. The second terminal T2 is electrically connected to the other end of the magnetic element 20 via the second wiring W2 and the second magnetic pole 32. For example, an element current ic is supplied to the magnetic element 20 from the element circuit 20D. The element current ic is direct current, for example.

The element circuit 20D applies an element voltage Ve1 between the first terminal T1 and the second terminal T2. The element current ic based on the element voltage Ve1 flows through the magnetic element 20.

For example, by the element current ic equal to or higher than a threshold flowing through the magnetic element 20, oscillation occurs in a magnetic layer included in the magnetic element 20. The magnetic element 20 functions, for example, as an STO (Spin-Torque Oscillator). An alternating magnetic field (for example, a high-frequency magnetic field) is generated from the magnetic element 20 along with the oscillation. An alternating magnetic field generated by the magnetic element 20 is applied to the magnetic recording medium 80 to assist recording on the magnetic recording medium 80. For example, MAMR (Microwave Assisted Magnetic Recording) can be performed.

As described above, the controller 75 is configured to supply the recording current Iw to the coil 30c and supply the element current ic to the magnetic element 20.

FIG. 2 corresponds to a plan view of the medium facing surface 30F viewed from the magnetic recording medium 80.

As shown in FIGS. 1 and 2, the magnetic element 20 includes a first magnetic layer 21, a second magnetic layer 22, a third magnetic layer 23, a fourth magnetic layer 24, a fifth magnetic layer 25, and a first non-magnetic layer 41, a second non-magnetic layer 42, a third non-magnetic layer 43, a fourth non-magnetic layer 44, a fifth non-magnetic layer 45 and a sixth non-magnetic layer 46.

The second magnetic layer 22 is provided between the first magnetic layer 21 and the second magnetic pole 32. The third magnetic layer 23 is provided between the second magnetic layer 22 and the second magnetic pole 32. The fourth magnetic layer 24 is provided between the third magnetic layer 23 and the second magnetic pole 32. The fifth magnetic layer 25 is provided between the fourth magnetic layer 24 and the second magnetic pole 32.

The first non-magnetic layer 41 is provided between the first magnetic pole 31 and the first magnetic layer 21. The second non-magnetic layer 42 is provided between the first magnetic layer 21 and the second magnetic layer 22. The third non-magnetic layer 43 is provided between the second magnetic layer 22 and the third magnetic layer 23. The fourth non-magnetic layer 44 is provided between the third magnetic layer 23 and the fourth magnetic layer 24. The fifth non-magnetic layer 45 is provided between the fourth magnetic layer 24 and the fifth magnetic layer 25. The sixth non-magnetic layer 46 is provided between the fifth magnetic layer 25 and the second magnetic pole 32.

In the embodiments, the sixth non-magnetic layer 46 includes at least one selected from the group consisting of Cu, Au, Cr, Al, V and Ag.

By such a configuration, highly efficient and stable oscillation can be obtained. According to the embodiments, it is possible to provide a magnetic head capable of improving the recording density. An example of simulation results of the characteristics of the magnetic element will be described below.

Figure 4:
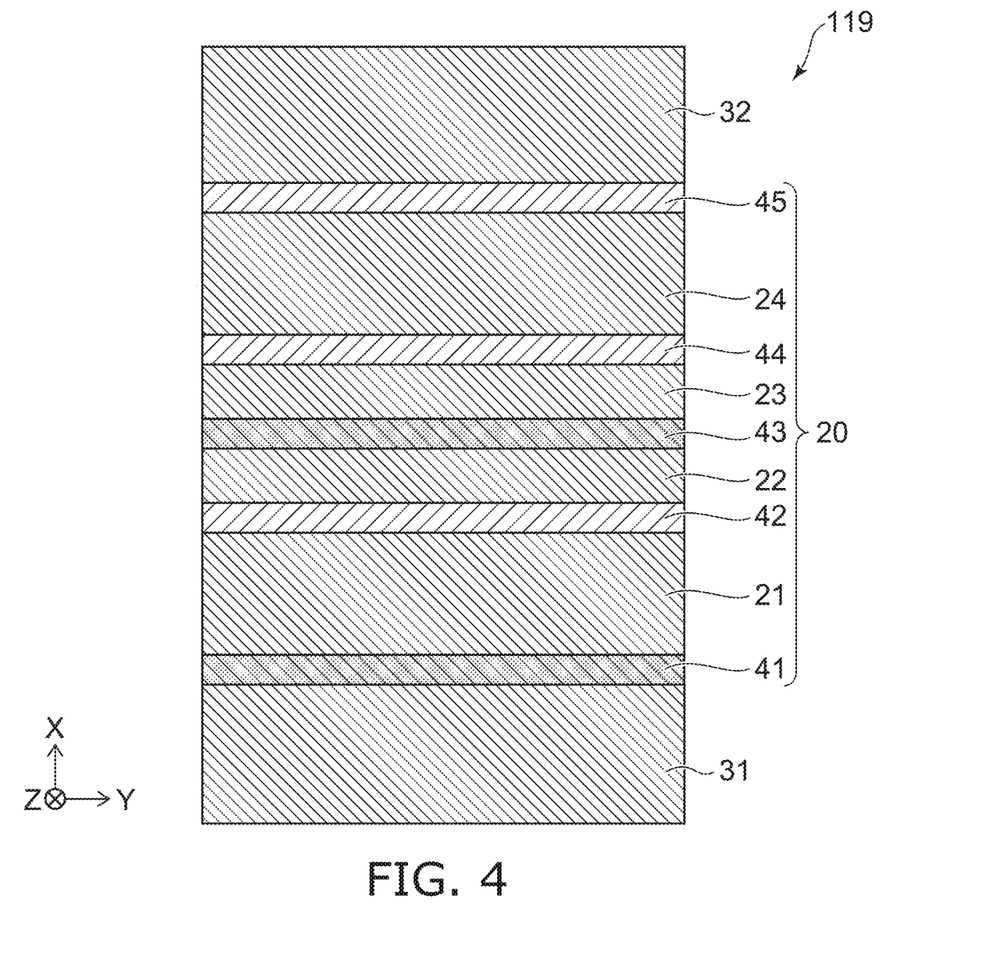
FIG. 4 is a schematic plan view illustrating a magnetic head of a reference example.

FIG. 4 is a schematic plan view illustrating a magnetic head of a reference example.

FIG. 4 shows a magnetic head 119 of a reference example. The magnetic head 119 has four magnetic layers and five non-magnetic layers.

Figure 5:
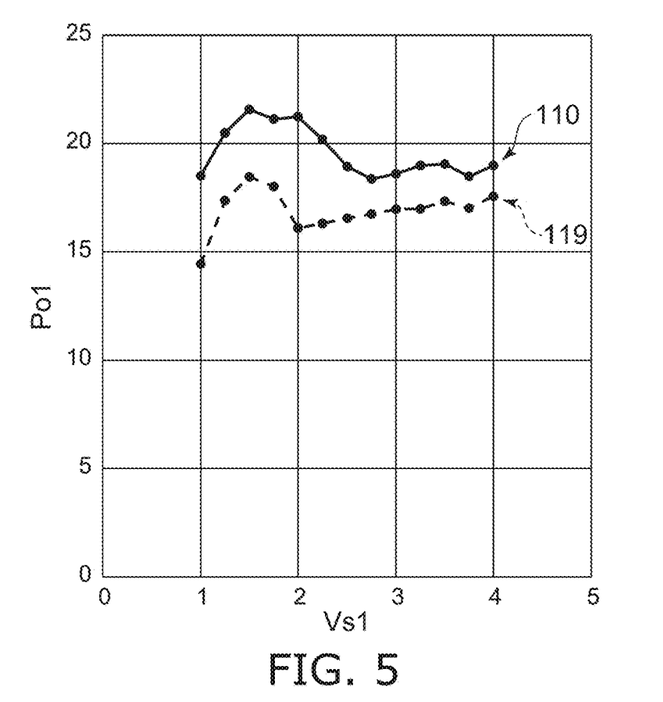
FIG. 5 is a graph illustrating characteristics of the magnetic heads.

FIG. 5 is a graph illustrating characteristics of the magnetic heads.

The horizontal axis of FIG. 5 is the normalized applied voltage Vs1. The applied voltage Vs1 is applied between one end of the magnetic element 20 and the other end. The vertical axis is the oscillation parameter Po1. The higher the oscillation parameter Po1, the higher the intensity of oscillation. In FIG. 5, the characteristics of the magnetic head 110 according to the embodiment and the characteristics of the magnetic head 119 of the reference example are shown.

As shown in FIG. 5, the oscillation parameter Po1 in the magnetic head 110 is higher than the oscillation parameter Po1 in the magnetic head 119 of the reference example. The oscillation parameter Po1 is lower than the oscillation parameter Po1 of the magnetic head 110 even when the thickness relationships of the magnetic layers included in the magnetic head 119 of the reference example are changed.

By a configuration in which the number of magnetic layers is five, high-intensity oscillation can be obtained. High efficiency and stable oscillation can be obtained.

According to the embodiments, it is possible to provide a magnetic head capable of improving the recording density.

As described above, the sixth non-magnetic layer 46 includes at least one selected from the group consisting of Cu, Au, Cr, Al, V and Ag. Thereby, providing and receiving spins between the fifth magnetic layer 25 and the second magnetic pole 32 becomes easy. For example, the second magnetic pole 32 functions as a spin injection layer for the fifth magnetic layer 25.

In the embodiments, the first non-magnetic layer 41 includes at least one selected from the group consisting of Ru, Ir, Ta, Rh, Pd, Pt and W, for example. For example, the second non-magnetic layer 42 includes at least one selected from the group consisting of Cu, Au, Cr, Al, V and Ag. For example, the third non-magnetic layer 43 includes at least one selected from the group consisting of Cu, Au, Cr, Al, V and Ag. For example, the fourth non-magnetic layer 44 includes at least one selected from the group consisting of Ru, Ir, Ta, Rh, Pd, Pt and W. For example, the fifth non-magnetic layer 45 includes at least one selected from the group consisting of Cu, Au, Cr, Al, V and Ag.

At least one of the first magnetic layer 21, the second magnetic layer 22, the third magnetic layer 23, the fourth magnetic layer 24, or the fifth magnetic layer 25 includes at least one selected from the group consisting of Fr, Co, and Ni. These magnetic layers are, for example, ferromagnetic layers.

As shown in FIG. 2, a thickness of the first magnetic layer 21 in the first direction D1 is defined as a first thickness t21. The first direction D1 is a direction from the first magnetic pole 31 to the second magnetic pole 32. A thickness of the second magnetic layer 22 in the first direction D1 is defined as a second thickness t22. A thickness of the third magnetic layer 23 in the first direction D1 is defined as a third thickness t23. A thickness of the fourth magnetic layer 24 in the first direction D1 is defined as a fourth thickness t24. A thickness of the fifth magnetic layer 25 in the first direction D1 is defined as a fifth thickness t25.

In the embodiments, the second thickness t22 is thicker than the first thickness t21. The second thickness t22 is thicker than the third thickness t23. The second thickness t22 is thicker than the fourth thickness t24. The fifth thickness t25 is thicker than the first thickness t21. The fifth thickness t25 is thicker than the third thickness t23. The fifth thickness t25 is thicker than the fourth thickness t24.

The second magnetic layer 22 and the fifth magnetic layer 25 function, for example, oscillation layers. The first magnetic layer 21, the third magnetic layer 23, and the fourth magnetic layer 24 function, for example, as spin injection layers.

For example, when the element current ic equal to or higher than the threshold voltage flows through the magnetic element 20, the magnetization 22M of the second magnetic layer 22 and the magnetization 25M of the fifth magnetic layer 25 oscillate. For example, an alternating magnetic field is generated.

For example, a component along the first direction D1 of the magnetization 24M of the fourth magnetic layer 24 is opposite to a component along the first direction D1 of the magnetization 23M of the third magnetic layer 23. A component along the first direction D1 of the magnetization 21M of the first magnetic layer 21 is opposite to the component along the first direction D1 of the magnetization 23M of the third magnetic layer 23.

As shown in FIG. 2, a thickness of the first non-magnetic layer 41 in the first direction D1 is defined as a first non-magnetic layer thickness t41. A thickness of the second non-magnetic layer 42 in the first direction D1 is defined as a second non-magnetic layer thickness t42. A thickness of the third non-magnetic layer 43 in the first direction D1 is defined as a third non-magnetic layer thickness t43. A thickness of the fourth non-magnetic layer 44 in the first direction D1 is defined as a fourth non-magnetic layer thickness t44. A thickness of the fifth non-magnetic layer 45 in the first direction D1 is defined as a fifth non-magnetic layer thickness t45. A thickness of the sixth non-magnetic layer 46 in the first direction D1 is defined as a sixth non-magnetic layer thickness t46.

For example, the second thickness t22 may be not less than 1.5 times and not more than 10 times the first thickness t21. The second thickness t22 may be not less than 1.5 times and not more than 10 times the third thickness t23. The second thickness t22 may be not less than 1.5 times and not more than 10 times the fourth thickness t24.

For example, the fifth thickness t25 may be not less than 1.5 times and not more than 10 times the first thickness t21. The fifth thickness t25 may be not less than 1.5 times and not more than 10 times the third thickness t23. The fifth thickness t25 may be not less than 1.5 times and not more than 10 times the fourth thickness t24.

For example, the first thickness t21 is not less than 0.5 nm and not more than 5 nm. For example, the second thickness t22 is not less than 4 nm and not more than 15 nm. For example, the third thickness t23 is not less than 0.5 nm and not more than 5 nm. For example, the fourth thickness t24 is not less than 0.5 nm and not more than 5 nm. For example, the fifth thickness t25 is not less than 4 nm and not more than 15 nm.

The first non-magnetic layer thickness t41 may be, for example, not less than 1 nm and not more than 10 nm. The second non-magnetic layer thickness t42 may be, for example, not less than 0.5 nm and not more than 6 nm. The third non-magnetic layer thickness t43 may be, for example, not less than 0.5 nm and not more than 6 nm. The fourth non-magnetic layer thickness t44 may be, for example, not less than 1 nm and not more than 10 nm. The fifth nonmagnetic layer thickness t45 may be, for example, not less than 0.5 nm and not more than 6 nm. The sixth non-magnetic layer thickness t46 may be, for example, not less than 0.5 nm and not more than 6 nm.

As shown in FIG. 2, when the magnetic head 110 is in operation, the element current ic equal to or higher than the threshold value is supplied to the magnetic element 20. The element current ic flows in the direction from the second magnetic pole 32 to the first magnetic pole 31, for example. An electron flow je corresponding to the device current ic flows in the direction from the first magnetic pole 31 to the second magnetic pole 32. The element current ic flows in the direction from the sixth non-magnetic layer 46 to the first non-magnetic layer 41.

The element voltage Ve1 is applied to the magnetic element 20 in the operation. A potential of the second magnetic pole 32 is higher than a potential of the first magnetic pole 31.

The element current ic and the element voltage Ve1 are supplied by the element circuit 20D. For example, one end of the magnetic element 20 is electrically connected to the first magnetic pole 31. The other end of the magnetic element 20 is electrically connected to the second magnetic pole 32. The element circuit 20D is configured to apply the element voltage Ve1 between the first magnetic pole 31 and the second magnetic pole 32. The potential of the first magnetic pole 31 is lower than the potential of the second magnetic pole 32 when the element voltage Ve1 is applied.

Figure 6:
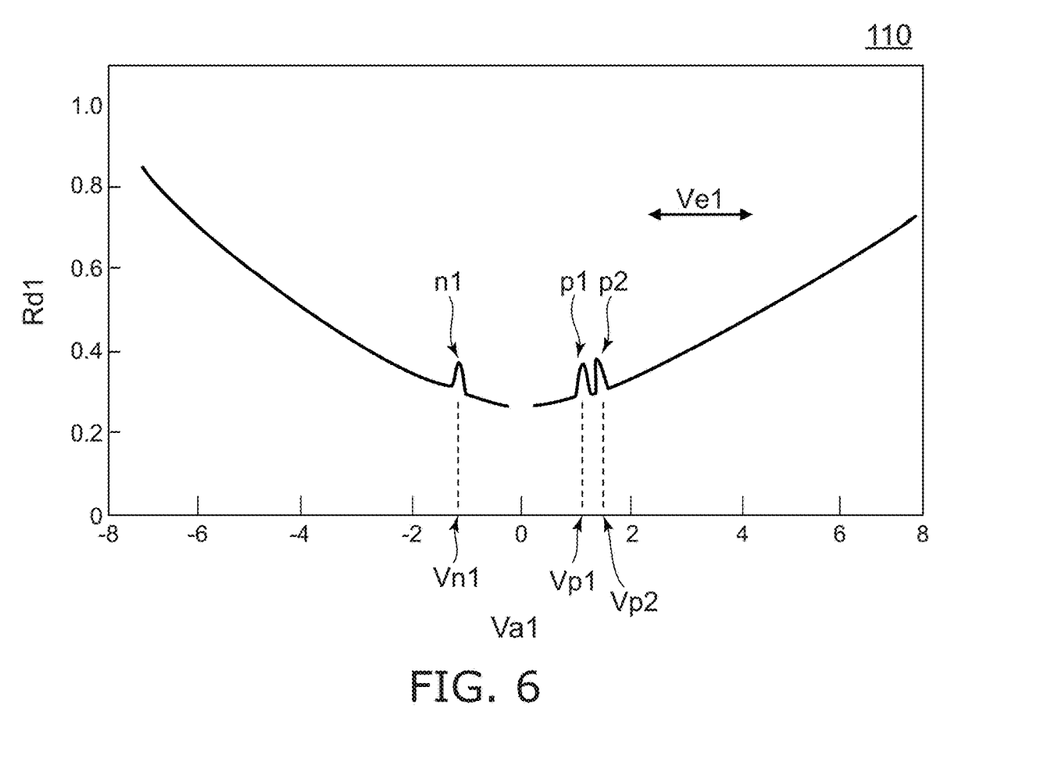
FIG. 6 is a graph illustrating characteristics of the magnetic head.

FIG. 6 is a graph illustrating characteristics of the magnetic head.

FIG. 6 illustrates a differential electrical resistance of the magnetic element 20 when the voltage Vat applied to the magnetic element 20 is changed. The horizontal axis of FIG. 6 is the voltage Vat. The vertical axis is the differential electrical resistance Rd1. The voltage Va1 may be the voltage between the first terminal T1 and the second terminal T2. For example, a voltage corresponding to voltage Va1 is applied to the magnetic element 20.

As shown in FIG. 6, the differential electrical resistance Rd1 when the voltage Va1 is changed includes three or more peaks. These peaks are considered to correspond to discontinuous changes in electrical resistance accompanying reversal of magnetization of the multiple magnetic layers included in the magnetic element 20.

The magnetic recording device 210 (see FIG. 3) includes the magnetic head according to the embodiment and the controller 75. The controller 75 includes the element circuit 20D. For example, one end of the magnetic element 20 is electrically connected to the first magnetic pole 31. The other end of the magnetic element 20 is electrically connected to the second magnetic pole 32. The potential of the first magnetic pole 31 is lower than the potential of the second magnetic pole 32 when the element voltage Ve1 is applied.

The differential electrical resistance Rd1 of the magnetic element 20 when the voltage Va1 between the first magnetic pole 31 and the second magnetic pole 32 is changed includes a first negative peak n1, a first positive peak p1 and a second positive peak p2. The voltage Va1 corresponding to the first negative peak n1 is defined as a first negative peak voltage Vn1. The voltage Va1 corresponding to the first positive peak p1 is defined as a first positive peak voltage Vp1. The voltage Va1 corresponding to the second positive peak p2 is defined as a second positive peak voltage Vp2.

The first negative peak voltage Vn1 is negative, and the first positive peak voltage Vp1 and the second positive peak voltage Vp2 are positive. The potential of the first magnetic pole 31 is higher than the potential of the second magnetic pole 32 when the negative voltage Vat is applied. The potential of the first magnetic pole 31 is lower than the potential of the second magnetic pole 32 when the positive voltage Vat is applied.

The first positive peak voltage Vp1 is higher than the first negative peak voltage Vn1 and lower than the second positive peak voltage Vp2. The element voltage Ve1 is equal to or higher than the second positive peak voltage Vp2. A stable and high-intensity oscillation can be obtained. The absolute value of the first negative peak voltage Vn1 may be greater than the second positive peak voltage Vp2.

Thus, the differential electrical resistance Rd1 includes three or more peaks (e.g., first peak, second peak and third peak). The "first peak" is, for example, the first negative peak n1. The "second peak" is, for example, the first positive peak p1. The "third peak" is, for example, the second positive peak p2. The first negative peak voltage Vn1 is, for example, the first voltage. The first positive peak voltage Vp1 is, for example, the second voltage. The second positive peak voltage Vp2 is, for example, the third voltage. The second voltage is between the first voltage and the third voltage. The element voltage Ve1 is equal to or higher than the third voltage.

In the magnetic head 110, for example, the absolute value of the element voltage Ve1 is ten times or less the absolute value of the first negative peak voltage Vn1. For example, the absolute value of the element voltage Ve1 may be eight times or less the absolute value of the first negative peak voltage Vn1. For example, the absolute value of the element voltage Ve1 is ten times or less the absolute value of the first positive peak voltage Vp1. The absolute value of the element voltage Ve1 may be eight times or less the absolute value of the first positive peak voltage Vp1.

In the magnetic head 110, for example, the absolute value of the third voltage is four times or less the absolute value of the first negative peak voltage Vn1. For example, the absolute value of the third voltage may be less than or equal to three times the absolute value of the first negative peak voltage Vn1. For example, the absolute value of the third voltage is four times or less the absolute value of the first positive peak voltage Vp1. The absolute value of the third voltage may be three times or less the absolute value of the first positive peak voltage Vp1.

In the embodiments, the tail of the first positive peak p1 may overlap the second positive peak p2. The tail of the second positive peak p2 may overlap the first positive peak p1.

In the embodiments, the first magnetic pole 31 may include a plurality of magnetic regions arranged along the X-axis direction. The second magnetic pole 32 may include a plurality of magnetic regions arranged along the X-axis direction. The boundaries between multiple magnetic regions may be clear or unclear. For example, the multiple magnetic regions are continuous.

Examples of other configurations of the magnetic recording device according to the embodiment will be described below. An example in which the magnetic head 110 is used will be described below. In the following description, the "magnetic head" may be any magnetic head (or any variation thereof) according to the embodiment.

Figure 7:
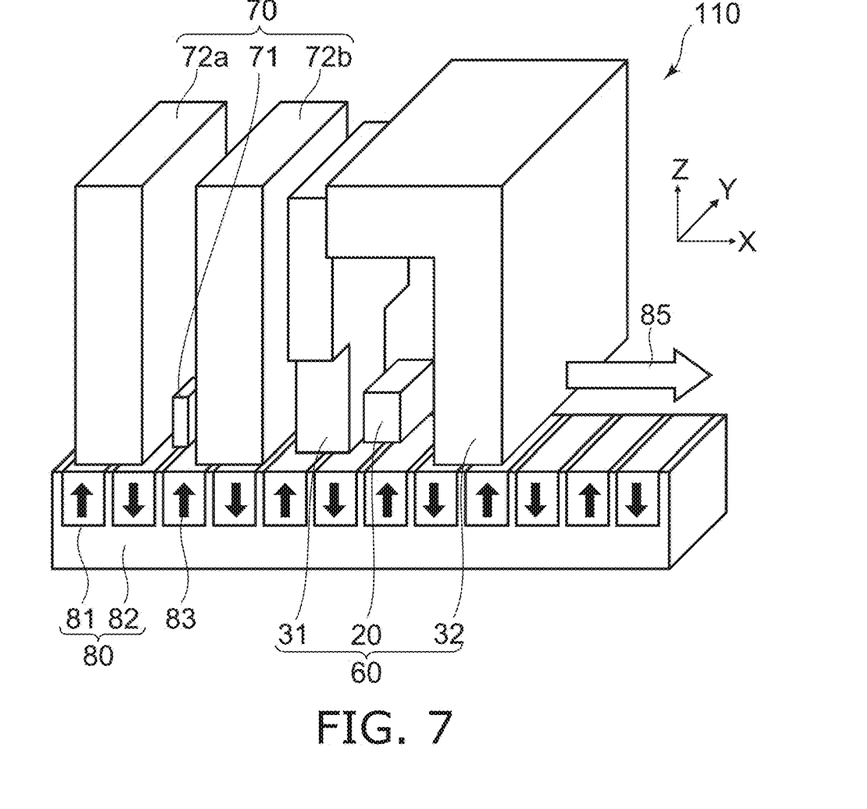
FIG. 7 is a schematic perspective view illustrating the magnetic recording device according to the embodiment.

FIG. 7 is a schematic perspective view illustrating the magnetic recording device according to the embodiment.

As shown in FIG. 7, the magnetic head (for example, the magnetic head 110) according to the embodiment is used together with the magnetic recording medium 80. In this example, the magnetic head 110 includes a recording section 60 and a reproducing section 70. Information is recorded on the magnetic recording medium 80 by the recording section 60 of the magnetic head 110. Information recorded on the magnetic recording medium 80 is reproduced by the reproducing section 70.

The magnetic recording medium 80 includes, for example, a medium substrate 82 and a magnetic recording layer 81 provided on the medium substrate 82. The magnetization 83 of the magnetic recording layer 81 is controlled by the recording section 60.

The reproducing section 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 is configured to output a signal corresponding to the magnetization 83 of the magnetic recording layer 81.

As shown in FIG. 7, the magnetic recording medium 80 moves relative to the magnetic head 110 in a direction of medium movement 85. Information corresponding to the magnetization 83 of the magnetic recording layer 81 is controlled at an arbitrary position by the magnetic head 110. Information corresponding to the magnetization 83 of the magnetic recording layer 81 is reproduced at an arbitrary position by the magnetic head 110.

Figure 8:
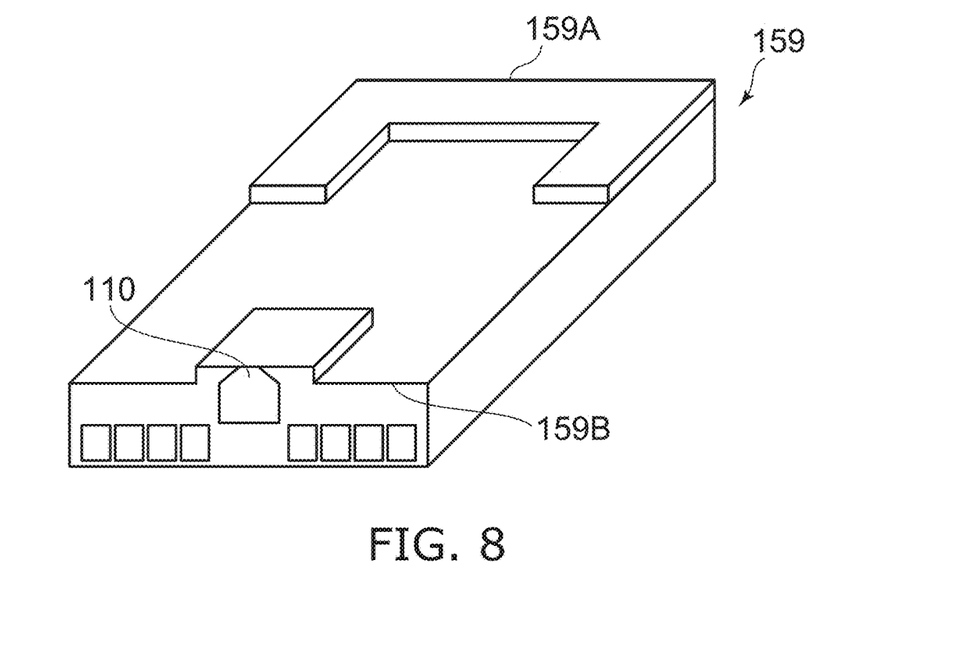
FIG. 8 is a schematic perspective view illustrating a part of the magnetic recording device according to the embodiment.

FIG. 8 is a schematic perspective view illustrating a part of the magnetic recording device according to the embodiment.

FIG. 8 illustrates a head slider.

The magnetic head 110 is provided on the head slider 159. The head slider 159 includes, for example, Al$_2$O$_3$/TiC or the like. The head slider 159 moves relative to the magnetic recording medium while floating or in contact with the magnetic recording medium.

The head slider 159 includes, for example, an air inflow side 159A and an air outflow side 159B. The magnetic head 110 is arranged on the side surface of the air outflow side 159B of the head slider 159 or the like. As a result, the magnetic head 110 moves relative to the magnetic recording medium while flying above or in contact with the magnetic recording medium.

Figure 9:
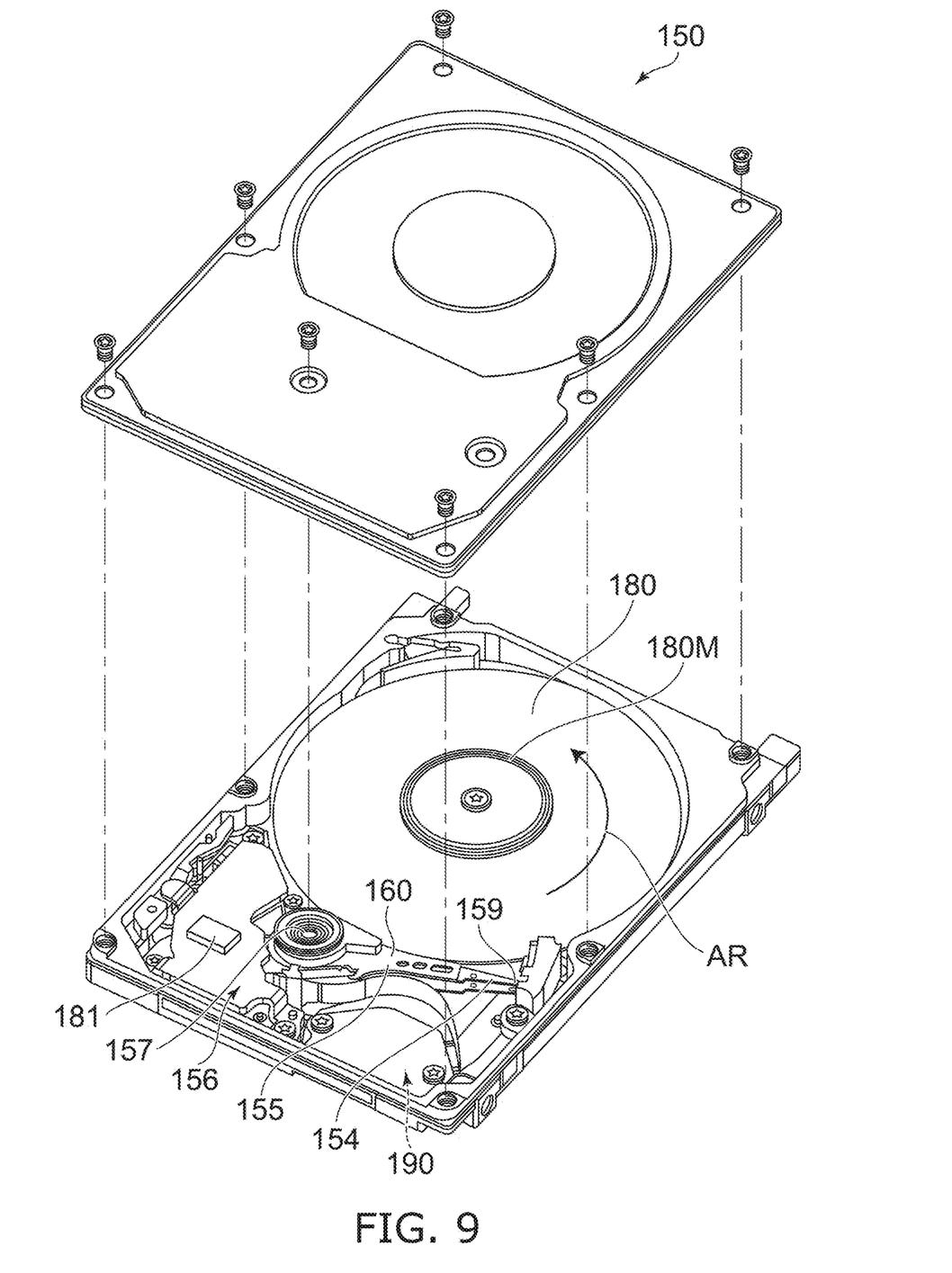
FIG. 9 is a schematic perspective view illustrating the magnetic recording device according to the embodiment.

FIG. 9 is a schematic perspective view illustrating the magnetic recording device according to the embodiment.

Figure 10A:
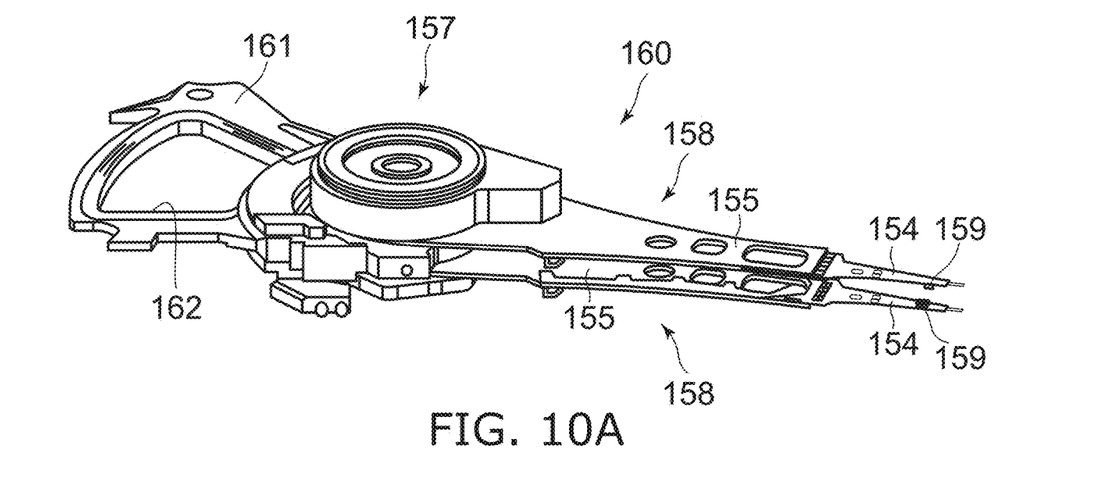
FIGS. 10A and 10B are schematic perspective views illustrating a part of the magnetic recording device according to the embodiment.
Figure 10B:
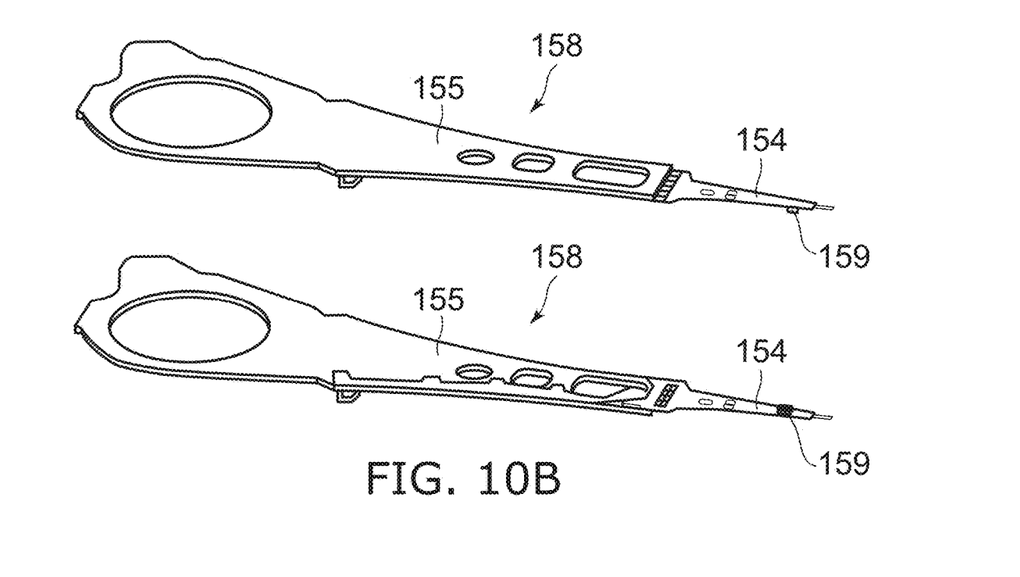

FIGS. 10A and 10B are schematic perspective views illustrating a part of the magnetic recording device according to the embodiment.

As shown in FIG. 9, in a magnetic recording device 150 according to the embodiment, a rotary actuator is used. The recording medium disk 180 is connected to a spindle motor 180M. The recording medium disk 180 is rotated in a direction of arrow AR by the spindle motor 180M. The spindle motor 180M is responsive to control signals from the drive device controller. The magnetic recording device 150 according to the embodiment may include the multiple recording medium disks 180. The magnetic recording device 150 may include a recording medium 181. The recording medium 181 is, for example, an SSD (Solid State Drive). A non-volatile memory such as a flash memory is used for the recording medium 181, for example. For example, the magnetic recording device 150 may be a hybrid HDD (Hard Disk Drive).

The head slider 159 records and reproduces information to be recorded on the recording medium disk 180. The head slider 159 is provided at an end of a thin-film suspension 154. A magnetic head according to the embodiment is provided near the end of the head slider 159.

While the recording medium disk 180 is rotating, the pressing pressure by the suspension 154 and the floating pressure generated at the medium facing surface (ABS) of the head slider 159 are balanced. The distance between the medium facing surface of the head slider 159 and the surface of the recording medium disk 180 is the predetermined fly height. In the embodiment, the head slider 159 may contact the recording medium disk 180. For example, a contact sliding type may be applied.

The suspension 154 is connected to one end of an arm 155 (e.g., an actuator arm). The arm 155 includes, for example, a bobbin part or the like. The bobbin part holds a drive coil. A voice coil motor 156 is provided at the other end of the arm 155. The voice coil motor 156 is a type of linear motor. The voice coil motor 156 includes, for example, a drive coil and a magnetic circuit. The drive coil is wound on the bobbin part of the arm 155. The magnetic circuit includes permanent magnets and opposing yokes. The drive coil is provided between the permanent magnet and the opposing yoke. The suspension 154 includes one end and the other end. The magnetic head is provided at one end of the suspension 154. The arm 155 is connected to the other end of the suspension 154.

The arm 155 is held by ball bearings. Ball bearings are provided at two locations above and below a bearing part 157. The arm 155 can be rotated and slid by the voice coil motor 156. The magnetic head can move to any position on the recording medium disk 180.

FIG. 10A is an enlarged perspective view of the head stack assembly 160, illustrating the configuration of a part of the magnetic recording device.

FIG. 10B is a perspective view illustrating the magnetic head assembly (head gimbal assembly: HGA) 158 that forms part of the head stack assembly 160.

As shown in FIG. 10A, the head stack assembly 160 includes the bearing part 157, the magnetic head assembly 158 and a support frame 161. The magnetic head assembly 158 extends from the bearing part 157. The support frame 161 extends from the bearing part 157. A direction in which the support frame 161 extends is opposite to a direction in which the magnetic head assembly 158 extends. The support frame 161 supports a coil 162 of the voice coil motor 156.

As shown in FIG. 10B, the magnetic head assembly 158 includes the arm 155 extending from the bearing part 157 and the suspension 154 extending from the arm 155.

The head slider 159 is provided at the end of the suspension 154. The head slider 159 is provided with the magnetic head according to the embodiment.

The magnetic head assembly 158 (head gimbal assembly) according to the embodiment includes the magnetic head according to the embodiment, the head slider 159 provided with the magnetic head, the suspension 154 and the arm 155. The head slider 159 is provided at one end of the suspension 154. The arm 155 is connected to the other end of the suspension 154.

The suspension 154 may include, for example, a wiring (not shown) for recording and reproducing signals. The suspension 154 may include, for example, a heater wiring (not shown) for adjusting the fly height. The suspension 154 may include a wiring (not shown) for, for example, an oscillator element or the like. These wires may be electrically connected to multiple electrodes provided on the magnetic head.

A signal processor 190 is provided in the magnetic recording device 150. The signal processor 190 uses a magnetic head to record and reproduce signals on a magnetic recording medium. Input/output lines of the signal processor 190 are connected to, for example, electrode pads of the magnetic head assembly 158 and electrically connected to the magnetic head.

The magnetic recording device 150 according to the embodiment includes the magnetic recording medium, the magnetic head according to the embodiment, a movable part, a position controller, and a signal processor. The movable part separates the magnetic recording medium from the magnetic head or makes them relatively movable while they are in contact with each other. The position controller aligns the magnetic head with a predetermined recording position on the magnetic recording medium. The signal processor records and reproduces signals on the magnetic recording medium using the magnetic head.

For example, the recording medium disk 180 is used as the above magnetic recording medium. The movable part includes, for example, the head slider 159. The position controller described above includes, for example, the magnetic head assembly 158.

The embodiments may include the following configurations (for example, technical proposals).

Configuration 1

A magnetic head, comprising:
a first magnetic pole;
a second magnetic pole; and a magnetic element provided between the first magnetic pole and the second magnetic pole,
the magnetic element including
a first magnetic layer,
a second magnetic layer provided between the first magnetic layer and the second magnetic pole,
a third magnetic layer provided between the second magnetic layer and the second magnetic pole,
a fourth magnetic layer provided between the third magnetic layer and the second magnetic pole,
a fifth magnetic layer provided between the fourth magnetic layer and the second magnetic pole,
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer,
a fourth non-magnetic layer provided between the third magnetic layer and the fourth magnetic layer,
a fifth non-magnetic layer provided between the fourth magnetic layer and the fifth magnetic layer, and
a sixth non-magnetic layer provided between the fifth magnetic layer and the second magnetic pole,
the sixth non-magnetic layer including at least one selected from the group consisting of Cu, Au, Cr, Al, V and Ag.

Configuration 2
The magnetic head according to Configuration 1, wherein
the first non-magnetic layer includes at least one selected from the group consisting of Ru, Ir, Ta, Rh, Pd, Pt and W,
the second non-magnetic layer includes at least one selected from the group consisting of Cu, Au, Cr, Al, V and Ag,
the third non-magnetic layer includes at least one selected from the group consisting of Cu, Au, Cr, Al, V and Ag,
the fourth non-magnetic layer includes at least one selected from the group consisting of Ru, Ir, Ta, Rh, Pd, Pt and W, and
The fifth non-magnetic layer includes at least one selected from the group consisting of Cu, Au, Cr, Al, V and Ag.

Configuration 3
The magnetic head according to Configuration 2, wherein
a second thickness of the second magnetic layer in a first direction from the first magnetic pole to the second magnetic pole is thicker than a first thickness of the first magnetic layer in the first direction,
the second thickness is thicker than a third thickness of the third magnetic layer in the first direction,
the second thickness is thicker than a fourth thickness of the fourth magnetic layer in the first direction, and
a fifth thickness of the fifth magnetic layer in the first direction is thicker than the first thickness, thicker than the third thickness, and thicker than the fourth thickness.

Configuration 4
The magnetic head according to Configuration 3, wherein
the second thickness is not less than 1.5 times and not more than 10 times the first thickness,
the second thickness is not less than 1.5 times and not more than 10 times the third thickness,
the second thickness is not less than 1.5 times and not more than 10 times the fourth thickness,
the fifth thickness is not less than 1.5 times and not more than 10 times the first thickness,
the fifth thickness is not less than 1.5 times and not more than 10 times the third thickness, and
the fifth thickness is not less than 1.5 times and not more than 10 times the fourth thickness.

Configuration 5
The magnetic head according to Configuration 3, wherein
the first thickness is not less than 0.5 nm and not more than 5 nm,
the second thickness is not less than 4 nm and not more than 10 nm,
the third thickness is not less than 0.5 nm and not more than 5 nm,
the fourth thickness is not less than 0.5 nm and not more than 5 nm, and
the fifth thickness is not less than 4 nm and not more than 10 nm.

Configuration 6
The magnetic head according to any one of Configurations 3-5, wherein
a first non-magnetic layer thickness of the first non-magnetic layer in the first direction is not less than 1 nm and not more than 10 nm,
a second non-magnetic layer thickness of the second non-magnetic layer in the first direction is not less than 0.5 nm and not more than 6 nm,
a third non-magnetic layer thickness of the third non-magnetic layer in the first direction is not less than 0.5 nm and not more than 6 nm,
a fourth non-magnetic layer thickness of the fourth non-magnetic layer in the first direction is not less than 1 nm and not more than 10 nm,
a fifth non-magnetic layer thickness of the fifth non-magnetic layer in the first direction is not less than 0.5 nm and not more than 6 nm, and
a sixth non-magnetic layer thickness of the sixth non-magnetic layer in the first direction is not less than 0.5 nm and not more than 6 nm or less.

Configuration 7
The magnetic head according to any one of Configurations 1-6, wherein
one end of the magnetic element is electrically connected to the first magnetic pole,
another end of the magnetic element is electrically connected to the second magnetic pole, and
a differential electrical resistance of the magnetic element when a voltage between the first magnetic pole and the second magnetic pole is changed includes 3 or more peaks.

Configuration 8
A magnetic recording device, comprising:
the magnetic head according to any one of Configurations 1-6; and
a controller including an element circuit,
one end of the magnetic element being electrically connected to the first magnetic pole,
another end of the magnetic element being electrically connected to the second magnetic pole,
the element circuit being configured to apply an element voltage between the first magnetic pole and the second magnetic pole,
when the element voltage is applied, a potential of the first magnetic pole being lower than a potential of the second magnetic pole.

Configuration 9
The magnetic recording device according to Configuration 8, wherein a differential electrical resistance of the magnetic element when changing a voltage between the first magnetic pole and the second magnetic pole includes a first peak, a second peak and a third peak, the voltage corresponding to the first peak is a first voltage, the voltage corresponding to the second peak is a second voltage, the voltage corresponding to the third peak is a third voltage, the second voltage is between the first voltage and the third voltage, and the element voltage is equal to or higher than the third voltage.

Configuration 10

The magnetic recording device according to Configuration 8, wherein a differential electrical resistance of the magnetic element when changing a voltage between the first magnetic pole and the second magnetic pole includes a first negative peak, a first positive peak and a second positive peak, the voltage corresponding to the first negative peak is a first negative peak voltage, the voltage corresponding to the first positive peak is a first positive peak voltage, the voltage corresponding to the second positive peak is a second positive peak voltage, the first positive peak voltage is between the first negative peak voltage and the second positive peak voltage, and the element voltage is equal to or higher than the second positive peak voltage.

According to the embodiments, it is possible to provide a magnetic head and a magnetic recording device capable of improving the recording density.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads and magnetic recording devices such as magnetic poles, magnetic elements, magnetic layers, non-magnetic layers, terminals, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads and magnetic recording devices practicable by an appropriate design modification by one skilled in the art based on the magnetic heads and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
   a first magnetic pole;
   a second magnetic pole; and
   a magnetic element provided between the first magnetic pole and the second magnetic pole,
   the magnetic element including:
      a first magnetic layer,
      a second magnetic layer provided between the first magnetic layer and the second magnetic pole,
      a third magnetic layer provided between the second magnetic layer and the second magnetic pole,
      a fourth magnetic layer provided between the third magnetic layer and the second magnetic pole,
      a fifth magnetic layer provided between the fourth magnetic layer and the second magnetic pole,
      a first non-magnetic layer provided between the first magnetic pole and the first magnetic layer,
      a second non-magnetic layer provided between the first magnetic layer and the second magnetic layer,
      a third non-magnetic layer provided between the second magnetic layer and the third magnetic layer,
      a fourth non-magnetic layer provided between the third magnetic layer and the fourth magnetic layer,
      a fifth non-magnetic layer provided between the fourth magnetic layer and the fifth magnetic layer, and
      a sixth non-magnetic layer provided between the fifth magnetic layer and the second magnetic pole,
      the sixth non-magnetic layer including at least one selected from the group consisting of Cu, Au, Cr, Al, and Ag, wherein
         the first non-magnetic layer includes at least one selected from the group consisting of Ru, Ir, Ta, Rh, Pd, Pt and W,
         the second non-magnetic layer includes at least one selected from the group consisting of Cu, Au, Cr, Al, and Ag,
         the third non-magnetic layer includes at least one selected from the group consisting of Cu, Au, Cr, Al, and Ag,
         the fourth non-magnetic layer includes at least one selected from the group consisting of Ru, Ir, Ta, Rh, Pd, Pt and W, and
         the fifth non-magnetic layer includes at least one selected from the group consisting of Cu, Au, Cr, Al, and Ag.

2. The magnetic head according to claim 1, wherein
   a second thickness of the second magnetic layer in a first direction from the first magnetic pole to the second magnetic pole is thicker than a first thickness of the first magnetic layer in the first direction,
   the second thickness is thicker than a third thickness of the third magnetic layer in the first direction,
   the second thickness is thicker than a fourth thickness of the fourth magnetic layer in the first direction, and a fifth thickness of the fifth magnetic layer in the first direction is thicker than the first thickness, thicker than the third thickness, and thicker than the fourth thickness.

3. The magnetic head according to claim 2, wherein
the second thickness is not less than 1.5 times and not more than 10 times the first thickness,
the second thickness is not less than 1.5 times and not more than 10 times the third thickness,
the second thickness is not less than 1.5 times and not more than 10 times the fourth thickness,
the fifth thickness is not less than 1.5 times and not more than 10 times the first thickness,
the fifth thickness is not less than 1.5 times and not more than 10 times the third thickness, and
the fifth thickness is not less than 1.5 times and not more than 10 times the fourth thickness.

4. The magnetic head according to claim 2, wherein
the first thickness is not less than 0.5 nm and not more than 5 nm,
the second thickness is not less than 4 nm and not more than 10 nm,
the third thickness is not less than 0.5 nm and not more than 5 nm,
the fourth thickness is not less than 0.5 nm and not more than 5 nm, and
the fifth thickness is not less than 4 nm and not more than 10 nm.

5. The magnetic head according to claim 2, wherein
a first non-magnetic layer thickness of the first non-magnetic layer in the first direction is not less than 1 nm and not more than 10 nm,
a second non-magnetic layer thickness of the second non-magnetic layer in the first direction is not less than 0.5 nm and not more than 6 nm,
a third non-magnetic layer thickness of the third non-magnetic layer in the first direction is not less than 0.5 nm and not more than 6 nm,
a fourth non-magnetic layer thickness of the fourth non-magnetic layer in the first direction is not less than 1 nm and not more than 10 nm,
a fifth non-magnetic layer thickness of the fifth non-magnetic layer in the first direction is not less than 0.5 nm and not more than 6 nm, and
a sixth non-magnetic layer thickness of the sixth non-magnetic layer in the first direction is not less than 0.5 nm and not more than 6 nm or less.

6. A magnetic recording device, comprising:
a magnetic head; and
a controller including an element circuit, the magnetic head including:
　a first magnetic pole;
　a second magnetic pole; and
　a magnetic element provided between the first magnetic pole and the second magnetic pole, the magnetic element including:
　　a first magnetic layer,
　　a second magnetic layer provided between the first magnetic layer and the second magnetic pole,
　　a third magnetic layer provided between the second magnetic layer and the second magnetic pole,
　　a fourth magnetic layer provided between the third magnetic layer and the second magnetic pole,
　　a fifth magnetic layer provided between the fourth magnetic layer and the second magnetic pole,
　　a first non-magnetic layer provided between the first magnetic pole and the first magnetic layer,
　　a second non-magnetic layer provided between the first magnetic layer and the second magnetic layer,
　　a third non-magnetic layer provided between the second magnetic layer and the third magnetic layer,
　　a fourth non-magnetic layer provided between the third magnetic layer and the fourth magnetic layer,
　　a fifth non-magnetic layer provided between the fourth magnetic layer and the fifth magnetic layer, and
　　a sixth non-magnetic layer provided between the fifth magnetic layer and the second magnetic pole,
the sixth non-magnetic layer including at least one selected from the group consisting of Cu, Au, Cr, Al, V and Ag,
one end of the magnetic element being electrically connected to the first magnetic pole,
another end of the magnetic element being electrically connected to the second magnetic pole,
the element circuit being configured to apply an element voltage between the first magnetic pole and the second magnetic pole,
when the element voltage is applied, a potential of the first magnetic pole being lower than a potential of the second magnetic pole, wherein
a differential electrical resistance of the magnetic element when changing a voltage between the first magnetic pole and the second magnetic pole includes a first peak, a second peak and a third peak,
the voltage corresponding to the first peak is a first voltage,
the voltage corresponding to the second peak is a second voltage,
the voltage corresponding to the third peak is a third voltage,
the second voltage is between the first voltage and the third voltage, and
the element voltage is equal to or higher than the third voltage.

7. A magnetic recording device, comprising:
a magnetic head; and
a controller including an element circuit, the magnetic head including:
　a first magnetic pole;
　a second magnetic pole; and
　a magnetic element provided between the first magnetic pole and the second magnetic pole, the magnetic element including:
　　a first magnetic layer,
　　a second magnetic layer provided between the first magnetic layer and the second magnetic pole,
　　a third magnetic layer provided between the second magnetic layer and the second magnetic pole,
　　a fourth magnetic layer provided between the third magnetic layer and the second magnetic pole,
　　a fifth magnetic layer provided between the fourth magnetic layer and the second magnetic pole,
　　a first non-magnetic layer provided between the first magnetic pole and the first magnetic layer,
　　a second non-magnetic layer provided between the first magnetic layer and the second magnetic layer,
　　a third non-magnetic layer provided between the second magnetic layer and the third magnetic layer,
　　a fourth non-magnetic layer provided between the third magnetic layer and the fourth magnetic layer, a fifth non-magnetic layer provided between the fourth magnetic layer and the fifth magnetic layer, and a sixth non-magnetic layer provided between the fifth magnetic layer and the second magnetic pole, the sixth non-magnetic layer including at least one selected from the group consisting of Cu, Au, Cr, Al, V and Ag, one end of the magnetic element being electrically connected to the first magnetic pole, another end of the magnetic element being electrically connected to the second magnetic pole, the element circuit being configured to apply an element voltage between the first magnetic pole and the second magnetic pole, when the element voltage is applied, a potential of the first magnetic pole being lower than a potential of the second magnetic pole, wherein a differential electrical resistance of the magnetic element when changing a voltage between the first magnetic pole and the second magnetic pole includes a first negative peak, a first positive peak and a second positive peak, the voltage corresponding to the first negative peak is a first negative peak voltage, the voltage corresponding to the first positive peak is a first positive peak voltage, the voltage corresponding to the second positive peak is a second positive peak voltage, the first positive peak voltage is between the first negative peak voltage and the second positive peak voltage, and the element voltage is equal to or higher than the second positive peak voltage.

* * * * *